US012723657B2

(12) United States Patent
Müller et al.

(10) Patent No.: US 12,723,657 B2
(45) Date of Patent: Sep. 1, 2026

(54) MECHANICAL SEAL ARRANGEMENT WITH SENSOR ARRANGEMENT

(71) Applicant: EagleBurgmann Germany Gmbh & Co. KG, Wolfratshausen (DE)

(72) Inventors: Michael Müller, Bichl (DE); Christoph Rapp, Ulm (DE); Phillip Von Schmidt, Ebenhausen (DE); Andreas Gröll, Berg (DE); Johannes Bauer, Wackersberg (DE); Johannes Proebstl, Wolfratshausen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 18/875,444

(22) PCT Filed: Jun. 19, 2023

(86) PCT No.: PCT/EP2023/066473
§ 371 (c)(1),
(2) Date: Dec. 16, 2024

(87) PCT Pub. No.: WO2024/008431
PCT Pub. Date: Jan. 11, 2024

(65) Prior Publication Data

US 2026/0016091 A1 Jan. 15, 2026

(30) Foreign Application Priority Data

Jul. 5, 2022 (DE) ..................... 10 2022 116 780.1

(51) Int. Cl.
*F16J 15/34* (2006.01)

(52) U.S. Cl.
CPC ......... *F16J 15/3492* (2013.01); *F16J 15/348* (2013.01)

(58) Field of Classification Search
CPC ........ F16J 15/34; F16J 15/3492; F16J 15/348; F16J 15/3464
See application file for complete search history.

(56) References Cited

U.S. PATENT DOCUMENTS 4,424,973 A * 1/1984 Heilala ................ F16J 15/3492 277/318
4,643,437 A * 2/1987 Salant .................. F16J 15/3432 277/377

(Continued)

FOREIGN PATENT DOCUMENTS

DE 102005053335 B4 9/2007
DE 202009008088 U1 8/2009

OTHER PUBLICATIONS

International Search Report issued in PCT/EP2023/066473, mailed Sep. 22, 2023.

*Primary Examiner* — Gilbert Y Lee
(74) *Attorney, Agent, or Firm* — Troutman Pepper Locke LLP; Scott D. Wofsy; Gabrielle L. Gelozin

(57) ABSTRACT

The invention relates to a mechanical seal arrangement comprising a mechanical seal (2; 12) with a rotating slide ring (3; 13) and a stationary slide ring (4; 14), which define a sealing gap (5; 15) between the sliding surfaces thereof, a pre-assembled assembly group including a first sensor (6) and a first cable arrangement (60) and a second sensor (7) with a second cable arrangement (70), wherein the first cable arrangement (60) and the second cable arrangement (70) are brought together to form a common cable harness (9), and wherein a free end of the common cable harness (9) comprises a multi-pole combination plug (10) with a plurality of contacts.

9 Claims, 3 Drawing Sheets

(56) References Cited

U.S. PATENT DOCUMENTS

Figure 1:
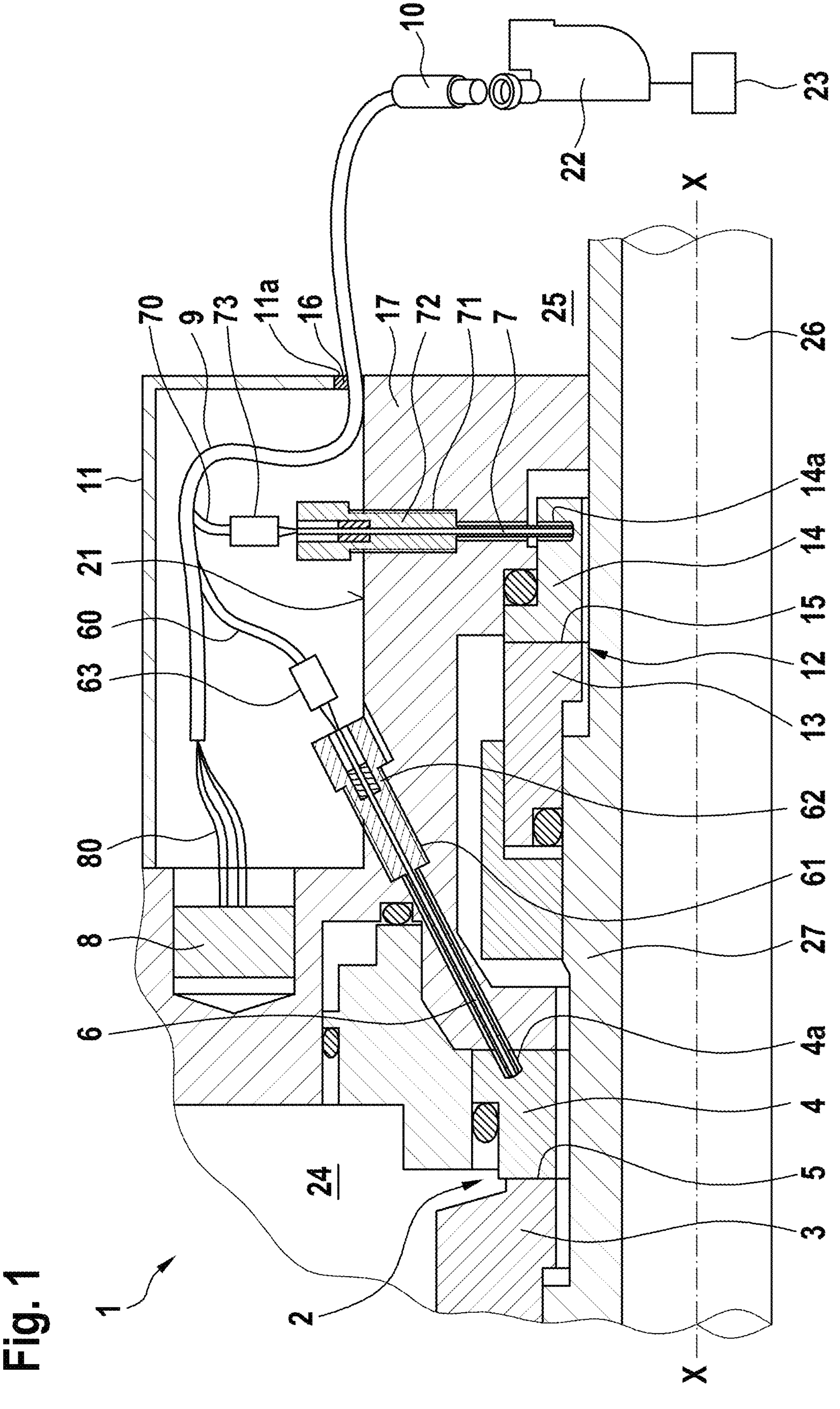

| | | | | |
|---|---|---|---|---|
| 4,691,276 | A * | 9/1987 | Miller | F16J 15/346<br>277/377 |
| 2001/0030396 | A1 | 10/2001 | Pecht et al. | |
| 2005/0014408 | A1 | 1/2005 | Swiatek et al. | |
| 2012/0242046 | A1* | 9/2012 | Spielvogel | F16J 15/3492<br>415/17 |

* cited by examiner 1
2
3
4
4a
5
6
7
8
9
10
11
11a
12
13
14
14a
15
16
17
21
22
23
24
25
26
27
60
61
62
63
70
71
72
73
80
X
X 1
2
3
4
4a
5
6
8
80
21
63
60
11
70
9
73
18
20
20a
11a
16
17
25
10
22
23
X
26
14
15
12
13
19
27
24

MECHANICAL SEAL ARRANGEMENT WITH SENSOR ARRANGEMENT

CROSS-REFERENCE TO RELATED APPLICATIONS

This application is a U.S. National Phase Application filed under 35 U.S.C. § 371, based on International Patent Application No. PCT/EP2023/066473, filed Jun. 19, 2023, which claims priority to German Patent Application No. DE 10 2022 116 780.1, filed on Jul. 5, 2022, which are incorporated herein by reference.

The present invention relates to a mechanical seal arrangement with a sensor arrangement which is easy to install and enables improved protection of sensitive sensors.

Mechanical seal arrangements are known from the prior art in various configurations. Recently, sensors have increasingly been used to obtain information regarding the condition of components of the mechanical seal arrangement during operation of the mechanical seal arrangement. However, the use of sensors makes the assembly of mechanical seal arrangements considerably more complicated, as the sensors, cables and the like have to be installed in addition to the usual components. This often results in damage to cables and/or sensors. Sealing cables and sensor components also involves additional effort and is often difficult. The use of sensors for sealing potentially explosive media is even more problematic. Here, additional explosion protection requirements are necessary with regard to electrical connections and cables as well as additional protection against dirt and/or moisture, which can further increase the susceptibility to faults when using sensors.

It is therefore the object of the present invention to provide a mechanical seal arrangement with sensors which enables simplified assembly with a simple structure and in particular also provides improved protection of cables and electrical connections and the like of sensors.

This object is achieved by means of a mechanical seal arrangement having the features of claim 1. The dependent claims show preferred embodiments of the invention.

The mechanical seal arrangement according to the invention having the features of claim 1 provides the advantage that a significantly simplified and faster assembly of sensors and associated cable arrangements is possible. Here it is possible that the sensors together with the cable arrangements can already be pre-assembled in the respective components during the manufacture of the mechanical seal, so that no separate assembly of sensors or the like is necessary during final assembly at a customer's premises. This significantly reduces or completely eliminates the risk of damage to sensors and their components during assembly at the customer's premises. The mechanical seal arrangement can also be used in explosion protection areas. Furthermore, the solution according to the invention is very compact and small in size, which is particularly advantageous for mechanical seal arrangements, as there is often only limited installation space available at the positions where the mechanical seal arrangement is arranged.

According to the invention, this is achieved in that the mechanical seal arrangement comprises a mechanical seal with a rotating and a stationary slide ring, which define a sealing gap between the sliding surfaces thereof. Furthermore, the mechanical seal arrangement comprises a pre-assembled assembly group with a first sensor with a first cable arrangement and a second sensor with a second cable arrangement. The first and second cable arrangements are brought together to form a common cable harness. At the end of the cable harness, a common multi-pole combination plug with a plurality of electrical connections or poles is arranged. In this way, the cable arrangements of the individual sensors are brought together to form a cable harness and then led to the multi-pole combination plug. This makes it possible for the sensors to be pre-assembled in the respective components of the mechanical seal arrangement, for example a housing or a stationary slide ring or a mechanical seal carrier, and then only the multi-pole combination plug needs to be inserted into a plug receptacle during assembly. This results in very simple and quick assembly on site at the customer's premises without any risk of damage to the sensors or line components or similar.

Preferably, the first and second sensors each comprise an external thread on a housing part of the sensor. This allows the sensors to be quickly and easily screwed into the respective components and pre-assembled.

The stationary slide ring or a stationary component of the mechanical seal arrangement, for example a housing or a stationary slide ring carrier, preferably further comprises a threaded hole into which the sensors can be screwed. Alternatively, a threaded sleeve with an internal thread is provided in each case, which is arranged in a hole of a stationary component in order to establish the screw connection with the sensors.

The mechanical seal arrangement preferably further comprises a cover with a lead-through for the cable harness, wherein a seal is arranged on the lead-through. The seal can be an O-ring, for example, through which the cable harness is passed, or alternatively a hot-melt seal.

According to a further preferred embodiment of the invention, the first sensor and the second sensor are different. In other words, the invention can be realized with a wide variety of sensors for different physical variables, the respective cable arrangements of which are brought together to form a cable harness and can be led out of the mechanical seal arrangement together.

The sensors are selected from the group of temperature sensors, pressure sensors, vibration sensors, speed sensors, optical sensors, leakage sensors or the like.

According to a further preferred embodiment of the invention, the first and/or second sensor is arranged in a blind hole in the stationary slide ring. The sensor is guided through a hole in a stationary component, preferably a housing. A sealing member is arranged between the sensor and the hole in the stationary component, through which the sensor is guided. The sealing member is pretensioned by means of a screw bolt or the like and seals against the stationary component and the sensor. The hole in the stationary component may preferably comprise a step at which the sealing member seals. The sealing member is preferably an O-ring through which the sensor is guided. As a result, the O-ring seals on the outer circumference of the sensor and on the inner circumference of the hole in the stationary component.

Further preferably, the screw bolt comprises an axial through-opening through which the sensor and/or a cable arrangement is guided. Thus, the sensor and/or a cable arrangement is guided through the screw bolt and the sealing member and the screw bolt simultaneously provides a seal on the stationary component as well as an attachment of the sensor and/or a cable arrangement to the stationary component.

The mechanical seal arrangement is preferably a tandem arrangement including a first and a second mechanical seal, wherein at least one sensor is arranged on each mechanical seal.

A recess is further preferably formed in the stationary component, preferably on an outer circumference of the stationary component, into which all the cable arrangements of the sensors end. The cable arrangements are then brought together in the recess to form the cable harness and the cable harness is led out of the recess and the mechanical seal.

The recess is preferably covered by the cover. The lead-through for the cable harness is preferably formed between the cover and the outer circumference of the housing.

Figure 2:
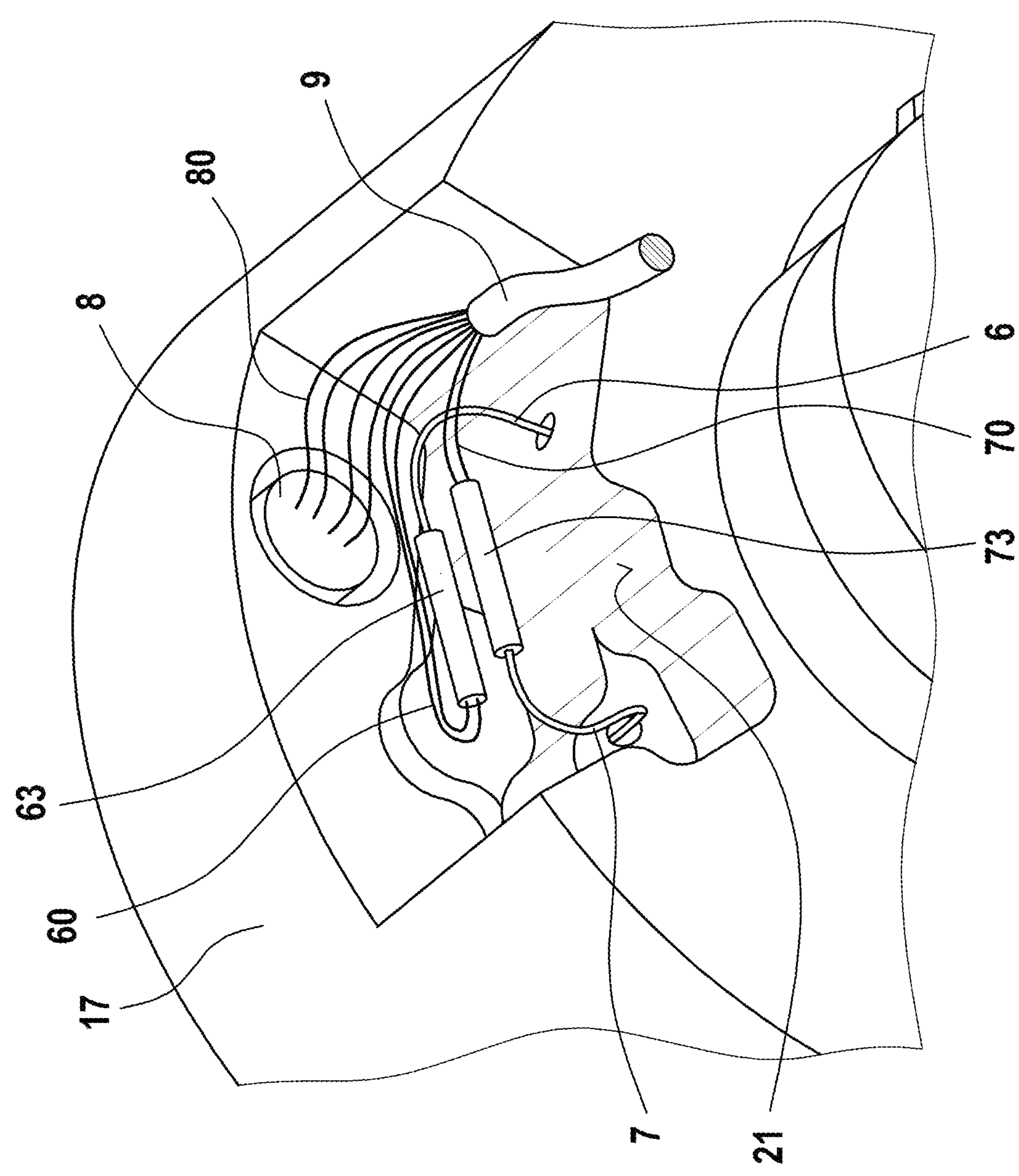
Figure 3:
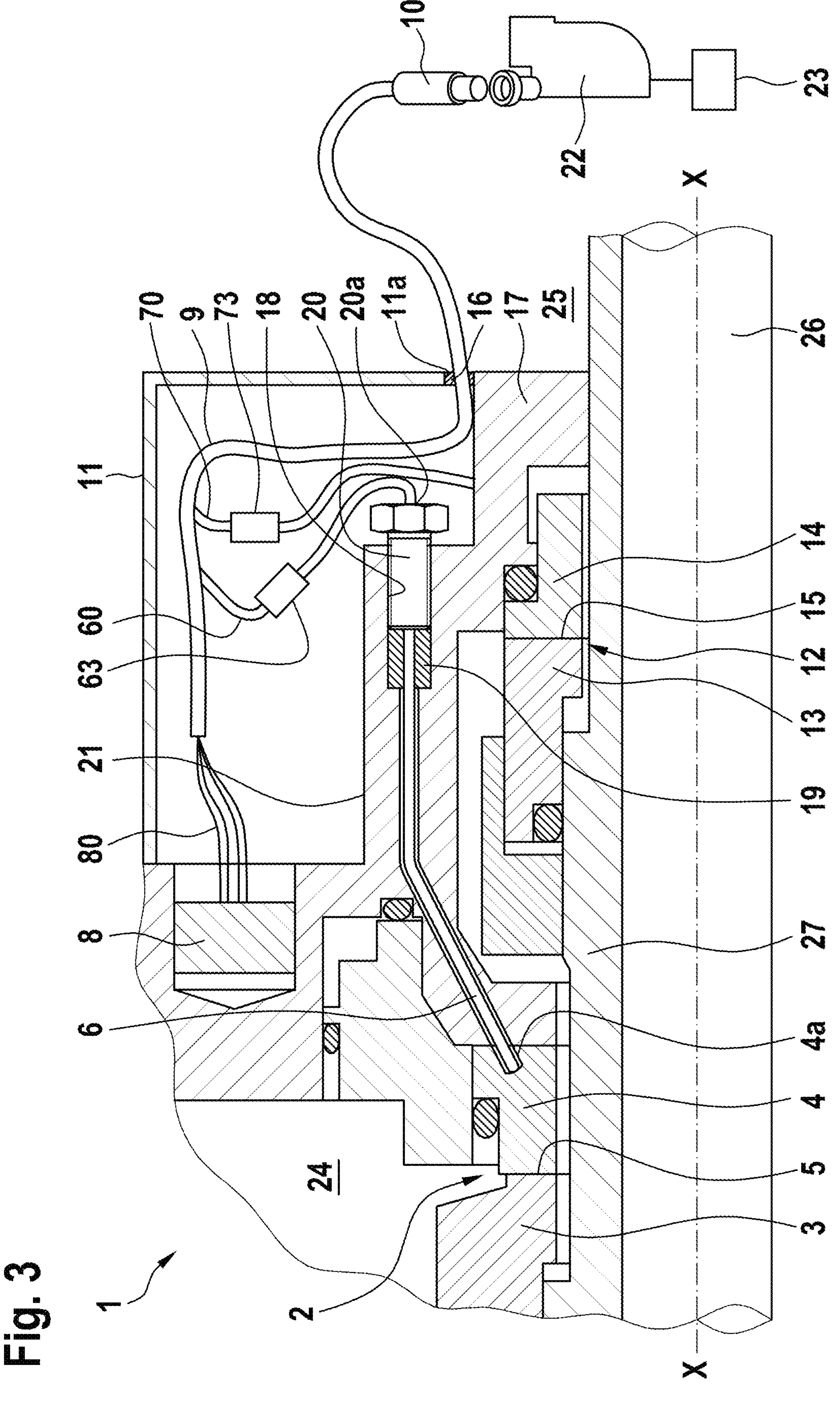

In the following, preferred embodiments of the invention are described in detail with reference to the accompanying drawing. The drawing shows:

FIG. 1 a schematic sectional view of a mechanical seal arrangement with sensors according to a first exemplary embodiment of the invention, FIG. 2 a schematic, perspective view of a partial area of the mechanical seal arrangement of FIG. 1, at which the cable harness is joined, and FIG. 3 a schematic sectional view of a mechanical seal according to a second exemplary embodiment of the invention.

With reference to FIGS. 1 and 2, a mechanical seal arrangement 1 according to a first embodiment of the invention is described in detail below.

As can be seen from FIG. 1, the mechanical seal arrangement 1 of the first exemplary embodiment is a so-called tandem mechanical seal, which comprises a first mechanical seal 2 and a second mechanical seal 12, which are connected in series in the axial direction X-X one after the other. The first and second mechanical seals 2 and 12 seal off a product chamber 24 from an atmosphere 25 on a shaft 26.

The mechanical seal arrangement 1 is a pre-assembled unit which is pre-mounted on a sleeve 27.

The first mechanical seal 2 comprises a rotating slide ring 3 and a stationary slide ring 4, which define a sealing gap 5 between the sliding surfaces thereof.

The second mechanical seal 12 comprises a rotating slide ring 13 and a stationary slide ring 14, which define a sealing gap 15 between the sliding surfaces thereof.

The mechanical seal arrangement 1 further comprises a stationary component 17 in the form of a housing.

Furthermore, the mechanical seal arrangement 1 comprises three sensors, namely a first sensor 6, a second sensor 7 and a third sensor 8.

The first sensor 6 is a temperature sensor, which is arranged in a blind hole 4*a* in the stationary slide ring 4 of the first mechanical seal 2. The second sensor 7 also is a temperature sensor, which is arranged in a blind hole 14*a* in the stationary slide ring 14 of the second mechanical seal 12. The third sensor 8 is a pressure sensor, which is arranged in the stationary component 17. The pressure sensor is connected to the product chamber 24 via gaps and measures the product pressure in the product chamber 24.

The first and second sensors 6, 7, which are both configured as temperature sensors, each measure the temperatures present at the stationary slide rings 4, 14 in order to draw conclusions about the operating behavior of the first and second mechanical seals 2, 12.

The first sensor 6 comprises a first cable arrangement 60, which is led out of the stationary component 17. The second sensor 7 comprises a second cable arrangement 70, which is also led out of the stationary component 17. The third sensor 8 comprises a third cable arrangement 80, which is also led out of the stationary component 17. The three cable arrangements 60, 70, 80 are then brought together to form a common cable harness 9. At an end facing away from the sensors, the common cable harness 9 comprises a multi-pole combination plug 10 with a plurality of connections.

The combination plug 10 only needs to be plugged into a plug receptacle 22, which is connected to an evaluation unit 23 or a control unit in order to process the variables recorded by the sensors 6, 7, 8.

The three cable arrangements 60, 70, 80 are brought together to form the common cable harness 9 at a recess 21 on the stationary component 17, which is covered by a cover 11. In order to lead the common cable harness 9 out of the recess 21, a lead-through 11*a* is provided between the stationary component 17 and the cover 11. A seal 16, for example an O-ring, through which the cable harness 9 is guided, is provided at the lead-through 11*a*.

As can also be seen from FIG. 1, the first sensor 6 comprises a housing part 62 on which an external thread 61 is provided. The first sensor 6 can thus be screwed into a threaded hole in the stationary component 17 and securely fastened. The second sensor 7 comprises a housing part 72 with an external thread 71.

In order to prevent the individual cables of the cable arrangements 60, 70, 80 from being damaged, a protective sleeve 63 is provided on the first cable arrangement 60 and a protective sleeve 73 is provided on the second cable arrangement 70.

As can be seen in detail in FIG. 2, the cable arrangements 60, 70, 80 are led out of the stationary component 17 into the recess 21. The recess 21 is arranged on an outer circumference of the stationary component and is protected by the cover 11. Within the recess 21, the cable arrangements 60, 70, 80 are brought together to form the common cable harness 9, which is then led out of the recess 21.

In this way, a pre-assembled mechanical seal arrangement 1 can be provided in which sensors 6, 7, 8 are used, which no longer have to be assembled on site at the customer's premises but can be pre-assembled at the manufacturer of the mechanical seal arrangement. The cover 11 protects the cable arrangements 60, 70, 80 from damage when the mechanical seal arrangement 1 is mounted on the shaft 26. A fitter then only has to insert the combination plug 10 into the plug receptacle 22 and the mechanical seal arrangement with sensors is ready for operation.

In this exemplary embodiment, the first sensor 6 and the second sensor 7 are temperature sensors. The third sensor 8 is a pressure sensor. Thus, a wide variety of sensors can be wired in a simple manner, irrespective of the number of individual cables of the respective cable arrangements 60, 70, 80. In particular, the invention prevents a tangle of cables, which is still present in the prior art when mounting the mechanical seal arrangement with sensors. This often results in incorrect electrical connections of the individual cables, which then have to be laboriously rewired in the correct manner once the mechanical seal arrangement has been installed.

By bringing them together in the recess 21, effective protection of the individual cables of the cable arrangements 60, 70, 80 is possible, as they no longer have to be touched when they are mounted on the shaft 26 to be sealed at the customer's premises.

The mechanical seal 1 is particularly suitable for use in areas with potentially explosive substances, as the cover 11 also provides ignition protection to prevent unwanted explosions caused by the sensors and/or their cable arrangements. The cover 11 also offers excellent protection against dirt and moisture, which could impair the function of the sensors 6, 7, 8.

The cover 11 together with the seal 16 also provides improved shielding against electrical and/or magnetic fields that could interfere with the function of the sensors 6, 7, 8. This also provides the advantage of reducing susceptibility to interference during data transmission.

The screw connection of the sensors 6, 7, 8 in the stationary component 17 is configured to be pressure-tight, so that no leakage can occur via the holes required for the sensors 6, 7, 8.

A strain relief is preferably also arranged on the seal 16 in order to prevent damage to the cable arrangements when inserting the combination plug 10 into the plug receptacle 22.

FIG. 3 shows a mechanical seal arrangement 1 according to a second exemplary embodiment of the invention. Identical or functionally identical parts are designated with the same reference numerals as in the first exemplary embodiment. In contrast to the first exemplary embodiment, a fixing of the first sensor 6 is different in the second exemplary embodiment. The second sensor is not shown. As can be seen in FIG. 3, the first cable arrangement 60 is guided through a screw bolt 20, which has a central through-opening 20*a* located in its axial axis. The screw bolt 20 is screwed into a threaded hole 18 in the stationary component 17. A sealing member 19 is arranged between a shoulder 18*a* of the threaded hole and the screw bolt, which is pressed against the shoulder 18*a* when the screw bolt 18 is screwed in. This enables pressure-tight sealing of the sensor 6. The sealing member 19 is a hose-like sealing member through which the sensor 6 is also guided. The sealing member 19 is compressed by the squeezing process by means of the screw bolt 20 and thus provides a pressure-tight seal on the outer circumference of the sensor 6 and on the inner circumference of the hole 18. For the rest, this exemplary embodiment corresponds to the previous exemplary embodiment, so that reference can be made to the description given there.

LIST OF REFERENCE NUMERALS

1 Mechanical seal arrangement
2 first mechanical seal
3 rotating slide ring
4 stationary slide ring
4*a* blind hole
5 sealing gap
6 first sensor
7 second sensor
8 third sensor
9 common cable harness
10 combination plug
11 cover
11*a* lead-through
12 second mechanical seal
13 rotating slide ring
14 stationary slide ring
14*a* blind hole
15 sealing gap
16 seal
17 stationary component/housing
18 threaded hole
18*a* shoulder
19 sealing member
20 screw bolt
20*a* through-opening
21 recess
22 plug receptacle
23 evaluation unit
24 product chamber
25 atmosphere
26 shaft
27 sleeve of the shaft
60 first cable arrangement
61 external thread
62 housing part of the first sensor
63 protective sleeve
70 second cable arrangement
71 external thread
72 housing part of the second sensor
73 protective sleeve
80 third cable arrangement
X-X axial direction

The invention claimed is:

1. Mechanical seal arrangement, comprising:

a mechanical seal with a rotating slide ring and a stationary slide ring, which define a sealing gap between sliding surfaces thereof, a pre-assembled assembly group with a first sensor and a first cable arrangement and a second sensor with a second cable arrangement, wherein the first cable arrangement and the second cable arrangement are brought together to form a common cable harness, and wherein a free end of the common cable harness comprises a multi-pole combination plug with a plurality of contacts, wherein the first sensor and/or the second sensor is arranged in a blind hole in the stationary slide ring and is guided through a hole in a stationary component, wherein the hole is sealed by means of a sealing member and a screw bolt which pretensions the sealing member.

2. Mechanical seal arrangement according to claim 1, wherein the first sensor and the second sensor each comprise an external thread on a housing part of the sensor.

3. Mechanical seal arrangement according to claim 1, wherein a stationary component of the mechanical seal arrangement comprises a thread into which the sensor is screwed.

4. Mechanical seal arrangement according to claim 1, further comprising a cover with a lead-through for the cable harness, wherein a seal is arranged on the lead-through.

5. Mechanical seal arrangement according to claim 1, wherein the first sensor and the second sensor are different sensors for different physical quantities.

6. Mechanical seal arrangement according to claim 1, wherein the first sensor and/or the second sensor is selected from the group of a temperature sensor, a pressure sensor, a vibration sensor, a speed sensor, an optical sensor, a leakage sensor.

7. Mechanical seal arrangement according to claim 1, wherein the screw bolt comprises an axial through-opening through which the sensor is guided.

8. Mechanical seal arrangement according to claim 1, which comprises two mechanical seals which are arranged in series on a sleeve, wherein at least one sensor is arranged on each mechanical seal.

9. Mechanical seal arrangement according to claim 1, wherein a recess is formed in the stationary component, in which recess all the cable arrangements of the sensors end and in which recess the cable arrangements are brought together to form the common cable harness.

* * * * *